US008447315B2

(12) United States Patent
Hakola et al.

(10) Patent No.: US 8,447,315 B2
(45) Date of Patent: May 21, 2013

(54) METHOD AND APPARATUS FOR FACILITATING DEVICE-TO-DEVICE COMMUNICATION (75) Inventors: Sami Hakola, Kempele (FI); Timo Koskela, Oulu (FI); Esa Tapani Tiirola, Kempele (FI)

(73) Assignee: Nokia Corporation, Espoo (FI)

( * ) Notice: Subject to any disclaimer, the term of this patent is extended or adjusted under 35 U.S.C. 154(b) by 350 days.

(21) Appl. No.: 12/793,267

(22) Filed: Jun. 3, 2010

(65) Prior Publication Data

US 2011/0300892 A1 Dec. 8, 2011

(51) Int. Cl.
H04B 7/00 (2006.01)
H04Q 7/20 (2006.01)

(52) U.S. Cl.
USPC ...... 455/452.1; 455/509; 455/447; 455/452.2

(58) Field of Classification Search
USPC .................. 455/450, 451, 452.1, 452.2, 509, 455/517, 41.2, 41.1, 447, 446, 515, 464, 455/67.11, 67.13; 370/338, 329, 331, 335
See application file for complete search history.

(56) References Cited

U.S. PATENT DOCUMENTS

| 6,240,080 | B1* | 5/2001 | Okanoue et al. ............. 370/338 |
| 7,440,728 | B2 | 10/2008 | Abhishek et al. |
| 7,548,758 | B2 | 6/2009 | Periyalwar et al. |
| 7,573,846 | B2* | 8/2009 | Rue et al. ..................... 370/329 |
| 2003/0139985 | A1 | 7/2003 | Naden et al. |
| 2008/0008132 | A1* | 1/2008 | Ushiki et al. ................. 370/331 |
| 2008/0031193 | A1 | 2/2008 | Laroia et al. |
| 2010/0081449 | A1 | 4/2010 | Chaudhri et al. |
| 2010/0093364 | A1 | 4/2010 | Ribeiro et al. |
| 2011/0151887 | A1 | 6/2011 | Hakola et al. |
| 2012/0300662 | A1 | 11/2012 | Wang et al. |

FOREIGN PATENT DOCUMENTS

| EP | 1604538 | 12/2005 |
| WO | WO-2004/077917 | 9/2004 |
| WO | WO 2006/016330 A1 | 2/2006 |
| WO | WO-2008/127420 | 10/2008 |
| WO | WO-2009/121025 | 10/2009 |

OTHER PUBLICATIONS

International Search Report and Written Opinion for Application No. PCT/FI2011/050420 dated Aug. 9, 2011.
Doppler, K., et al.; "*Innovative concepts in Peer-to-Peer and Network Coding*;" Celtic Telecommunication Solutions; Wireless World Initiative New Radio—Winner+; dated from Jan. 16, 2009; retrieved on Feb. 20, 2013 from <http://projects.celtic-initiative.org/winner+/Winner+%20Deliverables/D1.3_v1.pdf>.

(Continued)

*Primary Examiner* — John J Lee
(74) *Attorney, Agent, or Firm* — Alston & Bird LLP (57) ABSTRACT An apparatus for providing network assisted local communication offloading to unlicensed bands may include at least one processor and at least one memory including computer program code. The at least one memory and the computer program code may be configured, with the processor, to cause the apparatus to perform at least receiving information indicative of channel conditions associated with primary communication involving at least one primary mobile communication device and a network communication node, and determining, at a secondary mobile communication device, primary communication resources to be utilized for secondary communication by the secondary mobile communication device based on the information indicative of the channel conditions. A corresponding method is also provided.

17 Claims, 8 Drawing Sheets

OTHER PUBLICATIONS

Janis, P., et al.; *"Interference-Aware Resource Allocation for Device-to-Device Radio Underlaying Cellular Networks;"* dated 2009 <ftp://lenst.det.unifi.it/pub/LenLar/proceedings/2009/vtc09/Data/09-04-05.Pdf>; retrieved on Feb. 20, 2013 from <http://www.google.com/url?sa=t&rct=j&q=interference-aware%20resource%20allocation%20for%20device-to-device%20radio%20underlaying%20cellular%20networks&source=web&cd=1&ved=0CDYQFjAA&url=http%3A%2F%2F202.194.20.8%2Fproc%2FVTC09Spring%2FDATA%2F09-04-05.PDF&ei=puOkUanuN86v0AHsooEo&usg=AFQjCNF09n1Zous3Umvb8dsldvh39Zboqw&bvm=bv.42661473,d.dmQ>.

Xu, S., et al.; *"Effective Interference Cancellation Scheme for Device-to-Device Communication Underlaying Cellular Networks;"* dated 2010; retrieved on Feb. 20, 2013 from <http://www.google.com/search?q=Effective+Interference+Cancellation+Scheme+for+Device-to-Device+Communication+UnderlayingCellular+Networks&rls=com.microsoft:en-us&ie=UTF-8&oe=UTF-8&startIndex=&startPage=1>.

\* cited by examiner

METHOD AND APPARATUS FOR FACILITATING DEVICE-TO-DEVICE COMMUNICATION

TECHNOLOGICAL FIELD

Embodiments of the present invention relate generally to inter-device communications technology and, more particularly, relate to an apparatus and method for facilitating device-to-device (D2D) communication.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer. However, as the number of wireless communication device users continues to increase, the strain on the limited resources in the licensed spectrum also increases.

To provide increased numbers of services to large numbers of users, efficient use of the available radio network resources has become an important consideration. Accordingly, the integration of new network topologies into cellular networks has become an interesting topic to industry planners. In this regard, the study heterogeneous networks (e.g., networks that employ multiple different access mechanisms such as macro base stations, micro base stations, pico base stations, femto base stations, relays and other devices employing perhaps the same spectrum e.g. within a long term evolution (LTE) or LTE-Advanced (LTE-A) network) has become an important topic in relation to enabling heterogeneous local communication directly between devices and/or machines under the supervision of the network.

Autonomous D2D communication (e.g., communication between devices within range of an access point such as an enhanced node B (eNB) of an LTE (or LTE-A) network) has been one aspect of heterogeneous local communication that provides some potential with respect to providing better resource management. However, D2D communication using, for example, network uplink resources without eNB involvement may result in interference problems with other devices attempting to utilize the same spectrum. Accordingly, it may be desirable to develop mechanisms for finding alternate ways to provide service to potentially large numbers of users in an environment with resources that may be limited.

BRIEF SUMMARY OF EXAMPLE EMBODIMENTS

A method and apparatus are therefore provided that may enable the facilitation of semi-autonomous D2D communication. Moreover, some embodiments may provide devices with an ability to employ aspects of cognitive radio in relation to identifying resources that may be useable for D2D communication, while minimizing or avoiding interference. Furthermore, some embodiments may be enabled to accomplish interference reduction and/or minimization while avoiding or reducing the need for such devices to perform air interface measurements (which may demand significant amounts of processing resources). Thus, more efficient usage of wireless resources may be enabled.

In one example embodiment, a method of providing facilitation of semi-autonomous D2D communication is provided. The method may include receiving information indicative of channel conditions associated with primary communication involving at least one primary mobile communication device and a network communication node, and determining, at a secondary mobile communication device, primary communication resources to be utilized for secondary communication by the secondary mobile communication device based on the information indicative of the channel conditions.

In another example embodiment, an apparatus for providing facilitation of semi-autonomous D2D communication is provided. The apparatus may include at least one processor and at least one memory including computer program code. The at least one memory and the computer program code may be configured, with the processor, to cause the apparatus to perform at least receiving information indicative of channel conditions associated with primary communication involving at least one primary mobile communication device and a network communication node, and determining, at a secondary mobile communication device, primary communication resources to be utilized for secondary communication by the secondary mobile communication device based on the information indicative of the channel conditions.

In another example embodiment, a method of providing facilitation of semi-autonomous D2D communication is provided. The method, from the perspective of a network communication node, may include generating, at a network communication node engaged in primary communication with at least one primary communication device, assistance information for enabling a secondary communication device to select primary communication resources for reuse in secondary communication based on the assistance information, and communicating the assistance information to the secondary communication device.

In another example embodiment, an apparatus for providing facilitation of semi-autonomous D2D communication is provided. The apparatus may include at least one processor and at least one memory including computer program code. The at least one memory and the computer program code may be configured, with the processor, to cause the apparatus to perform at least generating, at a network communication node engaged in primary communication with at least one primary communication device, assistance information for enabling a secondary communication device to select primary communication resources for reuse in secondary communication based on the assistance information, and communicating the assistance information to the secondary communication device.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a non-transitory, physical storage medium (e.g., volatile or non-volatile memory device), can be differentiated from a "computer-readable transmission medium," which refers to an electromagnetic signal.

As indicated above, the desirability of utilizing local resources in connection with cellular and/or other widely available network resources has been appreciated by many in the industry. Accordingly, efforts are being made to utilize cellular resources for D2D communication in certain situations. However, the utilization of these resources may cause increases in interference if other devices in the area are attempting to use the same resources. Thus, the distribution of resources becomes an important aspect in the efficient use of communication resources.

Autonomous D2D communication can create issues if it is not properly managed. For example, measurement of interference levels experienced by devices at different locations within a cell may reveal challenging interference situations that may be created by autonomously communicating local devices. In a situation in which there is a cellular user using the same resources for secondary communication (e.g., D2D communication) as another cellular user in the same cell or in a neighbor cell, interference may occur. Some attempts to manage resource distribution focus on utilizing access points or base stations (e.g., eNBs) to manage the distributions, or focus on enabling measurements to be made by UEs with respect to frequencies to be avoided to reduce interference. However, management of communication resources could be made more autonomous if the communication devices themselves were less reliant on eNB involvement in resource allocation. Some embodiments of the present invention may facilitate the provision of a more autonomous local heterogeneous communication environment. Moreover, some example embodiments may also reduce or avoid the need for air interface interference measurements that can be costly in terms of power consumption and complexity.

Many devices (e.g., user equipments (UEs) or other mobile terminals, base stations or other access points such as node Bs (NBs) or evolved node Bs (eNBs), etc.) may include multiple radios or may otherwise have configurable antennas to permit operation over multiple frequencies. Some example embodiments may be useful in connection with device-to-device (D2D) communication, although embodiments may be useful in other environments as well. D2D communication often involves direct communication between mobile terminals such as a first UE and a second UE without signaling from a network device such as an access point, base station or communication node. As such, some example embodiments may enable mobile terminals such as UEs to communicate directly with each other using, for example, uplink resources of a cellular or other communication network. Moreover, some embodiments may enable the mobile terminals to engage in such D2D communication by employing cognitive radio techniques involving adaptation to the local environment with respect to the utilization of communication resources. As such, for example, mobile terminals employing example embodiments may avoid or reduce interference and/or may avoid or reduce air interface measurements when locating, with various levels of assistance from the eNB, suitable resources for D2D communication.

Figure 1:
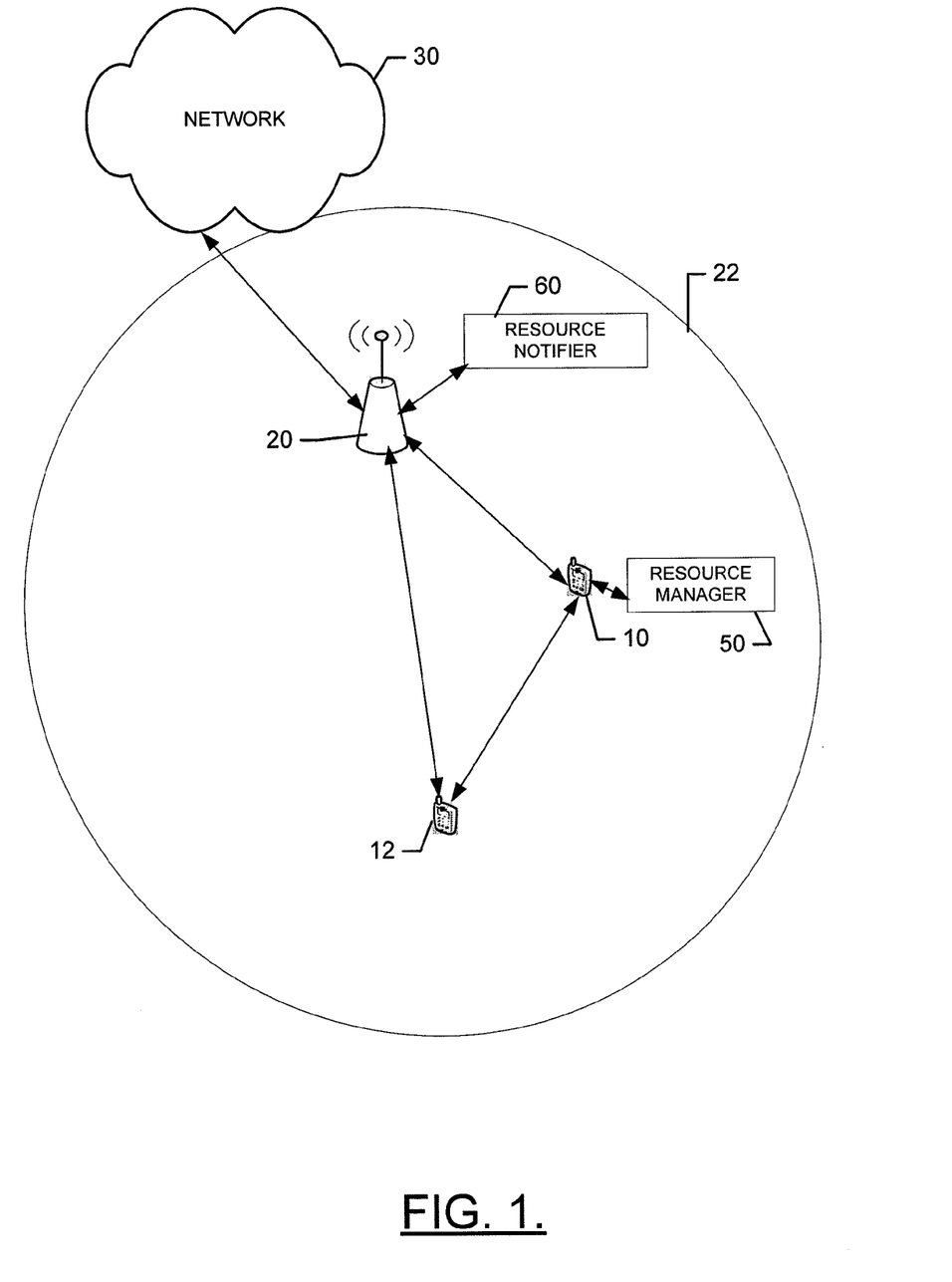
FIG. 1 illustrates one example of a communication system according to an example embodiment of the present invention.

FIG. 1 illustrates a generic system diagram in which a device such as a mobile terminal 10 (or UE), is shown in an example communication environment in which embodiments of the present invention may be employed. As shown in FIG. 1, an embodiment of a system in accordance with an example embodiment of the present invention may include a first communication device (e.g., mobile terminal 10) and a second communication device 12 that may each be capable of communication with a network 30. The second communication device 12 is provided as an example to illustrate potential multiplicity with respect to instances of other devices that may be included in the network 30 and that may practice some of example embodiments. The communications devices of the system may be able to communicate with network devices or with each other via the network 30. In some cases, the communication devices may be provided with access to the network via a base station or other communication node (e.g., eNB 20). The eNB 20 may have a coverage area 22 that defines a region within which communication devices may utilize the eNB 20 to access the network 30.

In some embodiments, one or more of the communication devices (e.g., the mobile terminal 10 or the second communication device 12) may act as a relay or gateway device for other communication devices or machines such as sensors to communicate with the network 30 and/or other devices. In an example embodiment, other access points may be located within the coverage area 22 of the eNB 20. These other access points may include femto or pico base stations (or any other access point associated with a local network or the network 30).

The network 30 may include a collection of various different nodes, devices or functions that may be in communication with each other via corresponding wired and/or wireless interfaces. As such, the illustration of FIG. 1 should be understood to be an example of a broad view of certain elements of the system and not an all inclusive or detailed view of the system or the network 30. One or more communication terminals such as the mobile terminal 10 and/or the second communication device 12 may be in communication with each other via the network 30 or via D2D communication. In some cases, each of the communication terminals may include an antenna or antennas for transmitting signals to and for receiving signals from a base site (e.g., eNB 20). The base site could be, for example a base station that is a part of one or more cellular or mobile networks or an access point that may be coupled to a data network, such as a local area network (LAN), a metropolitan area network (MAN), and/or a wide area network (WAN), such as the Internet. In turn, other devices such as processing circuitry (e.g., personal computers, server computers or the like) may be coupled to the mobile terminal 10 and/or the second communication device 12 via the network 30. In some embodiments, the network 30 may employ one or more mobile access mechanisms such as wideband code division multiple access (WCDMA), CDMA2000, global system for mobile communications (GSM), general packet radio service (GPRS), LTE, LTE-A and/or the like may be supported.

In some example embodiments, the mobile terminal 10 (and/or the second communication device 12) may be a mobile communication device such as, for example, a personal digital assistant (PDA), wireless telephone, mobile computing device, camera, video recorder, audio/video player, positioning device (e.g., a global positioning system (GPS) device), game device, television device, radio device, or various other like devices or combinations thereof. As such, the mobile terminal 10 may include one or more processors and one or more memories for storing instructions, which when executed by the processor, cause the mobile terminal 10 to operate in a particular way or execute specific functionality. The mobile terminal 10 may also include communication circuitry and corresponding hardware/software to enable communication with other devices.

In some embodiments, the communication devices (e.g., the mobile terminal 10 and/or the second communication device 12) may include a resource manager 50 configured to facilitate operation of the communication devices with respect to determining which air interface resources to employ, e.g., for D2D communication, machine-to-machine (M2M) communication, peer-to-peer (P2P) communication and/or the like, with other communication devices. The air interface resources that are to be utilized for D2D communication (e.g., secondary communication) may be considered to be secondary resources as opposed to the primary resources that are employed for typical cellular communications involving the access point or base station (e.g., eNB 20). In some embodiments, the access point or base station (e.g., eNB 20) providing primary resources may include a resource notifier 60 configured to provide information on resource allocations within the cell or coverage area 22 associated with the eNB 20. In an example embodiment, the resource manager 50 may be configured to determine which resources to use for secondary communication. The determination may be made with assistance from the resource notifier 60.

Figure 2:
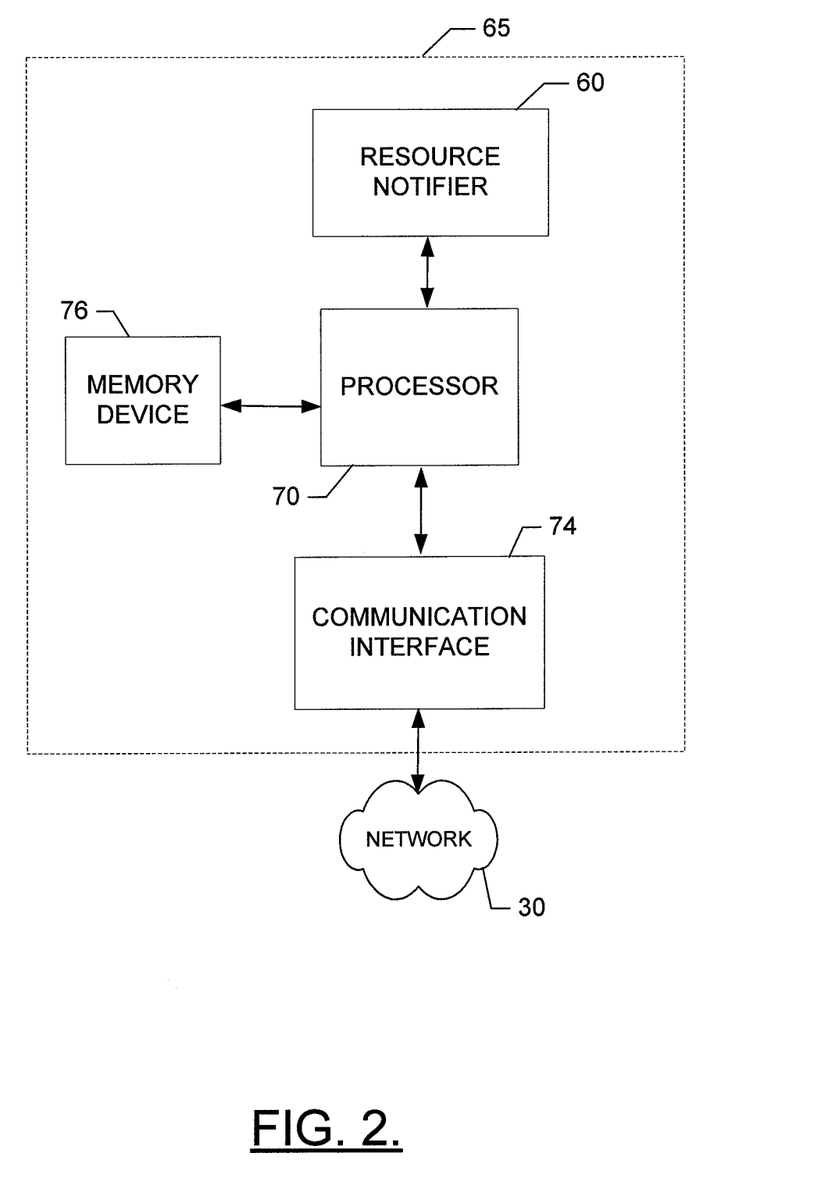
FIG. 2 illustrates a block diagram showing an access point based apparatus for providing facilitation of semi-autonomous D2D communication in accordance with an example embodiment of the present invention.

In an example embodiment, the eNB 20 may be configured to include or otherwise employ an apparatus according to an example embodiment of the present invention. FIG. 2 illustrates a schematic block diagram of an apparatus 65 for providing facilitation of semi-autonomous D2D communication according to an example embodiment of the present invention. An example embodiment will now be described with reference to FIG. 2, in which certain elements of an apparatus for providing facilitation of semi-autonomous D2D communication are displayed. The apparatus 65 of FIG. 2 may be employed, for example, on an access point, base site, communication node or a variety of other devices. However, it should be noted that the components, devices or elements described below may not be mandatory and thus some may be omitted in certain embodiments. Additionally, some embodiments may include further components, devices or elements beyond those shown and described herein.

Referring now to FIG. 2, the apparatus 65 may include or otherwise be in communication with a processor 70, a communication interface 74 and a memory device 76. The memory device 76 may include, for example, one or more volatile and/or non-volatile memories. In other words, for example, the memory device 76 may be an electronic storage device (e.g., a computer readable storage medium) comprising gates configured to store data (e.g., bits) that may be retrievable by a machine (e.g., a computing device). The memory device 76 may be configured to store information, data, applications, instructions or the like for enabling the apparatus to carry out various functions in accordance with example embodiments of the present invention. For example, the memory device 76 could be configured to buffer input data for processing by the processor 70. Additionally or alternatively, the memory device 76 could be configured to store instructions for execution by the processor 70.

The processor 70 may be embodied in a number of different ways. For example, the processor 70 may be embodied as one or more of various processing means such as a coprocessor, a microprocessor, a controller, a digital signal processor (DSP), a processing element with or without an accompanying DSP, or various other examples of processing circuitry including integrated circuits such as, for example, an ASIC (application specific integrated circuit), an FPGA (field programmable gate array), a microcontroller unit (MCU), a hardware accelerator, a special-purpose computer chip, or the like. In an example embodiment, the processor 70 may be configured to execute instructions stored in the memory device 76 or otherwise accessible to the processor 70. Alternatively or additionally, the processor 70 may be configured to execute hard coded functionality. As such, whether configured by hardware or software methods, or by a combination thereof, the processor 70 may represent an entity (e.g., physically embodied in circuitry) capable of performing operations according to embodiments of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and/or operations described herein when the instructions are executed. However, in some cases, the processor 70 may be a processor of a specific device (e.g., an eNB, AP or other network device) adapted for employing embodiments of the present invention by further configuration of the processor 70 by instructions for performing the algorithms and/or operations described herein. The processor 70 may include, among, other things, a clock, an arithmetic logic unit (ALU) and logic gates configured to support operation of the processor 70.

Meanwhile, the communication interface 74 may be any means such as a device or circuitry embodied in either hardware, or a combination of hardware and software that is configured to receive and/or transmit data from/to a network and/or any other device or module in communication with the apparatus. In this regard, the communication interface 74 may include, for example, an antenna (or multiple antennas) and supporting hardware and/or software for enabling communications with a wireless communication network. In some environments, the communication interface 74 may alternatively or also support wired communication. As such, for example, the communication interface 74 may include a communication modem and/or other hardware/software for supporting communication via cable, digital subscriber line (DSL), universal serial bus (USB) or other mechanisms.

In an example embodiment, the processor 70 may be embodied as, include or otherwise control the resource notifier 60. As such, in some embodiments, the processor 70 may be said to cause, direct or control the execution or occurrence of the various functions attributed to the resource notifier 60 as described herein. The resource notifier 60 may be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the resource notifier 60 as described herein. Thus, in examples in which software is employed, a device or circuitry (e.g., the processor 70 in one example) executing the software forms the structure associated with such means.

In an example embodiment, the resource notifier 60 is configured to signal identity information of active users of uplink resources of the eNB 20. In some examples, the resource notifier 60 may be configured to enable the broadcast of a radio network temporary identifier (RNTI) of each active user that is using uplink resources of the eNB 20. For example, the resource notifier 60 may cause the eNB 20 to transmit a list of RNTIs in a physical downlink control channel (PDCCH) transmitted by the eNB 20. Accordingly, for example, a device decoding the PDDCH may be aware of the identity of the devices that are being served by the eNB 20. Such a device (e.g., the mobile terminal 10) may then, for example, determine which air interface resources to employ for secondary communication based on channel conditions associated with each respective user of the uplink resources.

In this regard, devices that are in areas that are experiencing bad radio conditions (e.g., at the cell edge or experiencing other environmental factors that reduce channel quality) may be expected to be using relatively high transmit powers for their communications. Thus, interference with these devices may be more likely if their radio resources were to be used in connection with secondary communication. Accordingly, resources corresponding to devices that are associated with bad radio conditions may be avoided due to the increased likelihood of interference with such devices based on the expectation of their use of high transmission powers.

In some embodiments, the resource notifier 60 may provide further information to assist the mobile terminal 10 in determining which resources to use for secondary communication. For example, the resource notifier 60 may be configured to provide information that is indicative of the channel conditions experienced by devices that are actively using uplink resources of the eNB 20. In an example embodiment, the resource notifier 60 may be configured to provide a list of RNTIs of active users along with a corresponding indication of channel conditions. In some cases, the indication may take the form of an indication of the number of control channel elements (CCEs) used for some RNTIs or even each respective RNTI.

A control channel element (CCE) is a building block for the PDCCH, which can contain 36 subcarriers. One PDCCH instance can be obtained by concatenation of a number of CCEs (e.g., 1, 2, 4, 8) to be able to convey different payload sizes and different coding rates (e.g., aggregation). Accordingly, it can be expected that devices that are experiencing good channel conditions may be using less CCEs, while devices that are experiencing poor channel conditions are likely to be using more CCEs. In some embodiments, having the PDCCH carried for example with 1 or 2 CCEs may indicate a high coding rate and good channel conditions. Meanwhile, a PDCCH carried with 4 or 8 CCEs may correspond to average or poor channel conditions, for example. Thus, by providing an indication as to the CCEs used to carry the PDCCH for each respective device as indicated by the list of RNTIs, the resource notifier 60 may be configured to provide information to the mobile terminal 10 to enable the mobile terminal 10 to determine which resources to use for secondary communication. It should be noted that in a general case there may be more than one PDCCH size option that a mobile terminal or UE needs to detect blindly, e.g., in such that different transmission modes have different PDCCH size options in use.

As indicated above, in some embodiments, the resource notifier 60 may be configured to provide an indication of the number of control channel elements (CCEs) used for some RNTIs. The indication could be the actual number of CCEs itself, or it could be an indication that is related to the number of CCEs, but is not indicative of the actual number. In this regard, for example, the resource notifier 60 may provide the indication only for RNTIs that have a number of CCEs that is either above or below a threshold. As such, in some cases, those devices having poor channel conditions may be identified by having the RNTI provided with an indication of a high number of CCEs (relative to the threshold), while in other embodiments, those devices having good channel conditions may be identified by having the RNTI provided with an indication of a low number of CCEs (relative to the threshold). In either case, it can be assumed that a device that does not have an indication provided in association with the RNTI of the corresponding device, has a number of CCEs associated therewith that does not meet the conditions required to provide the indication. In other words, if the threshold number of CCEs required to be listed is 4, it can be assumed that a device having a RNTI listed without any corresponding indication has less than the required number of CCEs (e.g., less than 4 in this case).

In some embodiments, the resource notifier 60 may be configured to provide an even greater level of assistance to the mobile terminal 10 (e.g., to the resource manager 50 of the mobile terminal 10) in relation to determining which resources to use for secondary communication. For example, in some cases, the resource notifier 60 may be configured to use the common search space of the PDCCH to locate information for locally communicating devices about free resources in the cell for the current subframe or information about resources on which the eNB 20 may estimate interference being low. Communication with neighbor cells may also be considered in this regard. Thus, for example, devices close to the eNB 20 (or to a neighbor eNB) may be expected to use resources at low powers that may be more likely to be available for secondary communication. Meanwhile, devices close to the edges of the current cell or neighbor cells may be expected to use resources at high powers and their associated resources may be poorer candidates for reuse for secondary communication.

Figure 3:
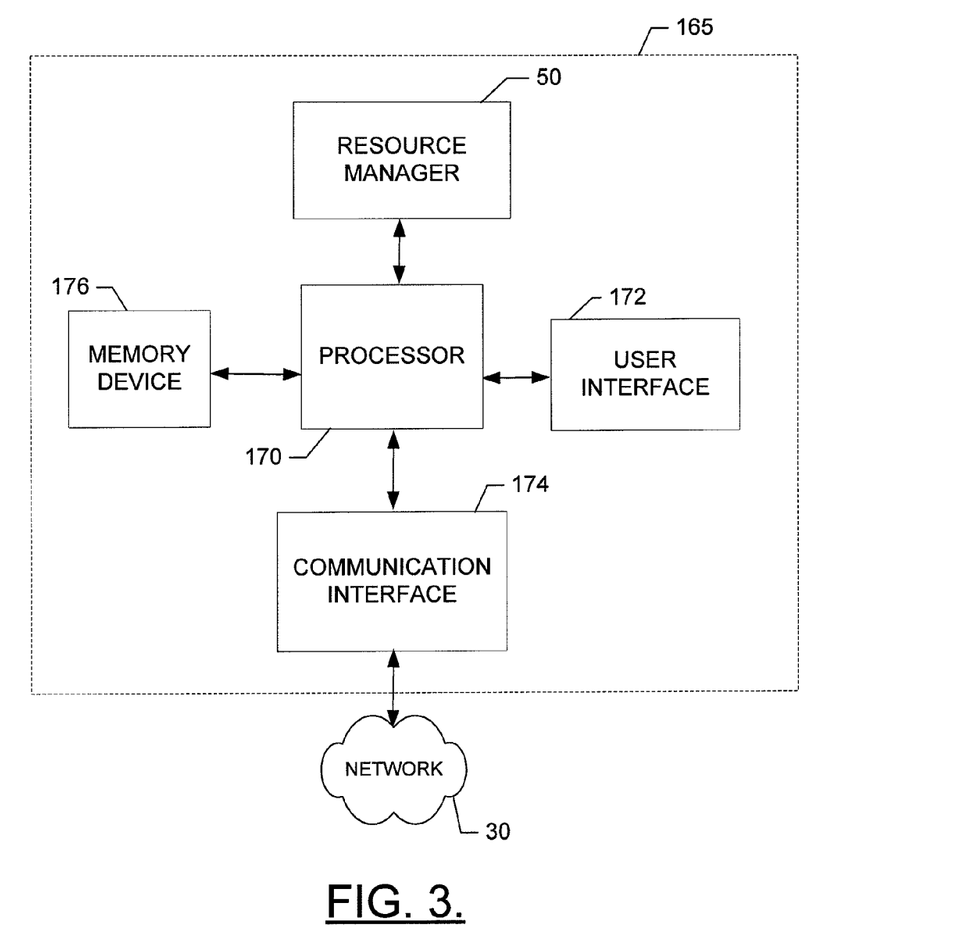
FIG. 3 illustrates a block diagram showing a mobile terminal based apparatus for providing facilitation of semi-autonomous D2D communication in accordance with an example embodiment of the present invention.

FIG. 3 is a block diagram of an apparatus 165 that may be employed in connection with a communication device (e.g., mobile terminal 10 and/or the second communication device 12) practicing an example embodiment of the present invention. The apparatus 165 may include or otherwise be in communication with a processor 170, a user interface 172, a communication interface 174 and a memory device 176. The processor 170, the communication interface 174, and the memory device 176 may each be similar in general function and form to the processor 70, the communication interface 74 and the memory device 76 described above (except perhaps with semantic and scale differences), so a detailed explanation of these components will not be provided. The user interface 172 may be in communication with the processor 170 to receive an indication of a user input at the user interface 172 and/or to provide an audible, visual, mechanical or other output to the user. As such, the user interface 172 may include, for example, a keyboard, a mouse, a joystick, a display, a touch screen, soft keys, a microphone, a speaker, or other input/output mechanisms. In this regard, for example, the processor 170 may comprise user interface circuitry configured to control at least some functions of one or more elements of the user interface, such as, for example, a speaker, ringer, microphone, display, and/or the like. The processor 170 and/or user interface circuitry comprising the processor 170 may be configured to control one or more functions of one or more elements of the user interface through computer program instructions (e.g., software and/or firmware) stored on a memory accessible to the processor 170 (e.g., memory device 176, and/or the like).

In an example embodiment, the processor 170 may be embodied as, include or otherwise control the resource manager 50. The resource manager 50 may be any means such as a device or circuitry operating in accordance with software or otherwise embodied in hardware or a combination of hardware and software (e.g., processor 170 operating under software control, the processor 170 embodied as an ASIC or FPGA specifically configured to perform the operations described herein, or a combination thereof) thereby configuring the device or circuitry to perform the corresponding functions of the resource manager 50 as described herein. Thus, in examples in which software is employed, a device or circuitry (e.g., the processor 170 in one example) executing the software forms the structure associated with such means.

In some embodiments, the resource manager 50 may be configured to utilize information indicative of the channel conditions associated with respective different devices to determine which communication resources to utilize for secondary communication. In an example embodiment, the resource manager 50 may utilize information provided by the eNB 20. For example, the resource manager 50 may decode PDCCH information provided by the eNB 20 (e.g., the RNTIs listed in association with each device using uplink resources) to determine the identity of devices in the serving area 22 (or perhaps neighbor cells as well). In some cases, the resource manager 50 may follow the PDCCH transmitted by the eNB 20 and attempt to decode the information behind the RNTIs broadcast by the eNB 20 (e.g., by the resource manager 50). The resource manager 50 may then attempt to identify devices to consider as "protected devices" (e.g., devices having resources that should be avoided with respect to reuse for secondary communication due to an increased probability of interference due, for example, to channel conditions experienced by such devices). As such, if the resource manager 50 can determine that a particular device is experiencing bad radio conditions, the particular device may be marked or otherwise considered to be a protected device. The resource manager 50 may then assign protected devices (or resources associated with protected devices) with a low priority rating with respect to reuse of the resources associated with the protected devices for secondary communication.

In an example embodiment, the determination as to which devices that are to be classified as protected devices may be made on the basis of CCEs, as described above. Thus, for example, the resource manager 50 may be configured to receive assistance information from the eNB 20 for use in determining the status of resource availability for secondary communication. In some cases, the assistance information may be in the form of a RNTI list of active devices using uplink resources of the eNB 20. In some embodiments, the assistance information may be a list of all active devices, a list only of active devices that are to be protected (e.g., devices having a number of CCEs that is above a threshold), or a list of active devices that are not to be protected. When a list of RNTIs is provided, the listed devices may in some cases be provided along with a number of CCEs or with some other indication related to the channel conditions of the associated device. In any case, the assistance information may be used by the resource manager 50 for secondary resource availability determinations.

In some embodiments, rather than receiving (or in addition to receiving) the assistance information, the resource manager 50 may be configured to determine or detect channel condition information (e.g., as indicated by CCEs) associated with each respective device communicating in the coverage area 22 (and perhaps also some neighboring cells) and make determinations regarding secondary communication availability of resources based on the information. Accordingly, the resource manager 50 may be configured to make determinations regarding secondary communication availability of resources with varying levels of network participation (e.g., as provided by the eNB 20).

Figure 4:
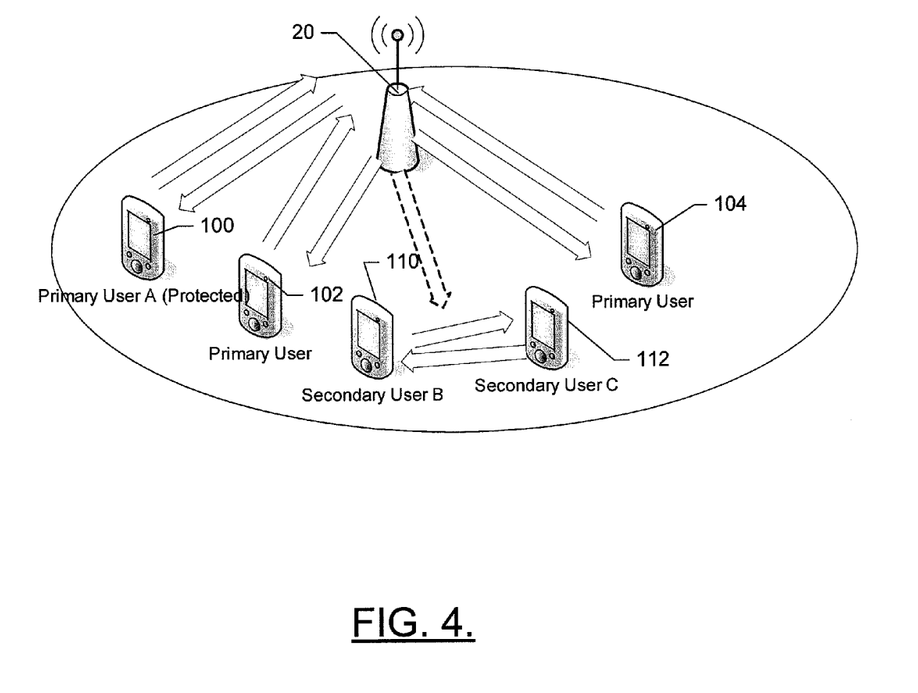
FIG. 4 illustrates a secondary resource usage scenario according to an example embodiment of the present invention.

FIG. 4 illustrates a secondary resource usage scenario according to an example embodiment. As shown in FIG. 4, a first primary user 100 (primary user A), a second primary user 102 and a third primary user 104 may each be utilizing uplink resources associated with the eNB 20. Two secondary users (e.g., secondary user B 110 and secondary user C 112) may each be equipped with an instance of the resource manager 50 and may decode resource allocations that are provided for the primary users and/or may receive assistance information from the eNB 20. In the example of FIG. 4, the second primary 102 user and the third primary user 104 may each be in areas with relatively good channel conditions, while the first primary user 100 is in an area with relatively poor channel conditions. The indications regarding the channel conditions may be provided via decoding of the PDCCH to determine CCE allocations for each respective device or may be received in the assistance information. If the first primary user 100 has relatively poor channel conditions, the first primary user 100 may be considered to be a protected device. Accordingly, the resources associated with the first primary user 100 may be assigned a low priority for reuse for secondary communication. Meanwhile, resources associated with the second primary 102 user and the third primary user 104 may be unprotected and therefore may be more highly prioritized in terms of being considered for reuse for secondary communication.

In an example embodiment, the resource manager 50 may be configured to determine a priority order for usage of resources for secondary communication. In some examples, priority order may be determined based on various factors. For example, in some cases, allocations with protected devices may not be used for secondary communication. Alternatively or additionally, if all the allocations in a cell can be decoded (e.g., for CCEs with 1,2,4 and 8) the autonomously communicating devices (e.g., secondary user B 110 and secondary user C 112) may be enabled to use the unused resources not allocated to cellular users (in case of partial load). As yet another alternative or additional capability, in cases in which the autonomously communicating devices are enabled to detect and decode resource allocation signaling for the cellular users with low value CCEs (e.g., 1 or 2 CCEs), the corresponding resources may be prioritized so that resources associated with higher CCE values (e.g., 4 or 8) have a low priority for reusing and resources associated with lower value CCEs (e.g., 1 or 2) may have a higher priority of reusing.

In some embodiments, autonomously communicating devices (e.g., secondary user B 110 and secondary user C 112) may not able to decode all the PDCCH fields. For example, a PDCCH with a low number of CCEs may not be detected far away from the eNB 20 due to channel quality levels being low. In some embodiments, the eNB 20 may signal the RNTI of those devices that have a high number of CCEs so that the corresponding devices can be marked as protected UEs (primary users). Alternatively, the autonomously communicating devices (e.g., secondary user B 110 and secondary user C 112) may try to detect PDCCHs with high numbers of CCEs and mark the corresponding devices as protected devices. The autonomously communicating devices may decode the resource allocation grants of the protected devices and can further examine (e.g., by measuring interference) the resources not associated with the protected devices that are to be used for the communication. This may enable the autonomously communicating devices that are located near the cell edge to also decode the resource allocations that are associated with a high number of CCEs to facilitate avoidance of the corresponding resources. In some cases, the network (e.g., via the eNB 20) may assign fixed resources for secondary communication, but when the protected devices are scheduled on the corresponding resources the resources scheduled may not be applicable to secondary usage.

In an example embodiment, autonomously communicating devices may be enabled to decode allocations with all CCEs (e.g., devices in good position related to the eNB 20 and with no coverage problems and a low number of CCEs) and partial load in the cell. The autonomously communicating devices can avoid the allocated resources and use the unutilized resource for secondary communication. Alternatively or additionally, autonomously communicating devices may be enabled to decode allocations with all CCEs (e.g., devices in good position related to eNB 20 and having no coverage problems due, for example to having a low number of CCEs) so that the devices can prioritize resource allocations signaled using, for example, 1 or 2 CCE elements above resource allocations signaled using higher values of CCEs (e.g., 4 or 8 CCE elements). In these examples, the devices may be enabled to check the suitability for secondary communication via interference measurements on the corresponding resources that otherwise appear to be available. To limit interference measurements by the autonomously communicating devices, the interference measurements may only be carried out on the uplink resources of devices that are not protected devices.

Figure 5:
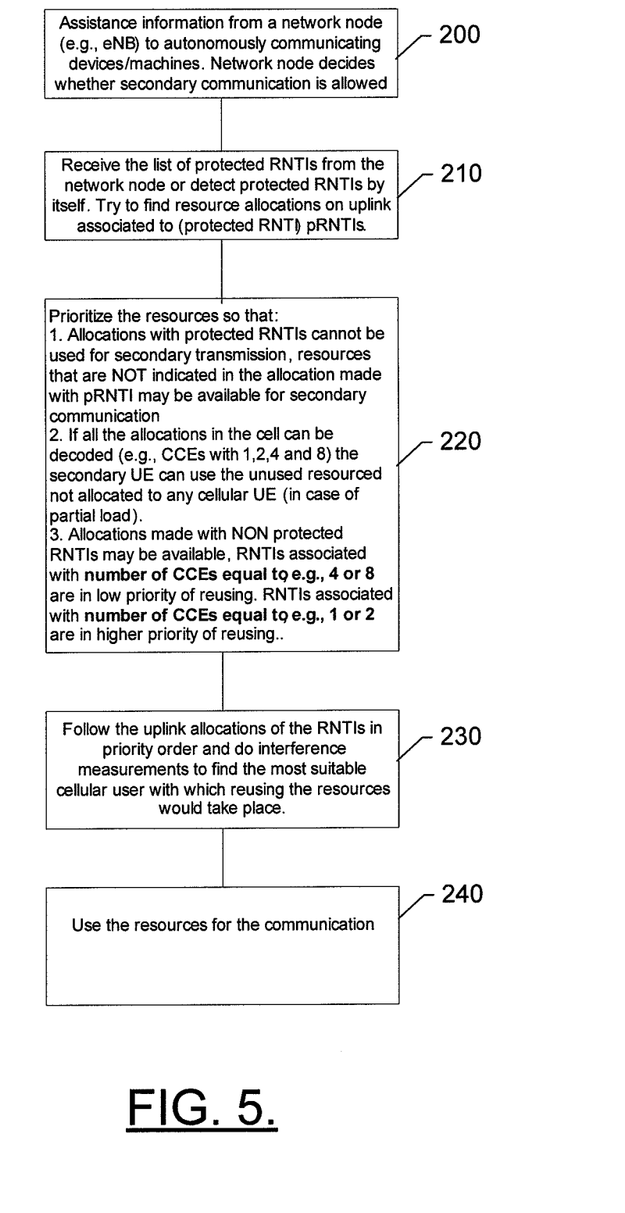
FIG. 5 illustrates an example flow chart descriptive of a sequence of operations that may be performed in accordance with an example embodiment of the present invention.

FIG. 5 illustrates an example flow chart descriptive of a sequence of operations that may be performed in accordance with an example embodiment. As shown in FIG. 5, at operation 200, assistance information may be provided by the eNB 20 to autonomously communicating devices. In some examples, the network may determine whether secondary communication is allowed at this stage. Thereafter, at operation 210, one or more of the autonomously communicating devices (e.g., secondary user B 110 and secondary user C 112) may receive a list of protected devices (e.g., identified by RNTIs) from the network (e.g., from the resource notifier 60 of the eNB 20). As an alternative, the autonomously communicating devices may detect protected devices themselves by trying to find resource allocations on uplink resources at operation 210. In both cases, the autonomously communicating devices (e.g., UEs corresponding to the secondary user B 110 and/or the secondary user C 112) may receive, in addition to the RNTIs of primary devices, the number of CCEs of primary devices as part of the signaling message. This can be realized e.g., in such that PDCCH carried with, for example, 8 (or 4 and 8) CCEs may only be considered as PDCCH of potential primary devices. At operation 220, resources may be prioritized as described above. Uplink allocations may be followed with respect to RNTIs listed in priority order at operation 230. Interference measurements may be performed on a limited set of devices (e.g., only those that are not protected and/or have a relatively high priority) in order to find the most suitable resources for reuse in secondary communication. The selected resources may then be used for secondary communication at operation 240.

Figure 6:
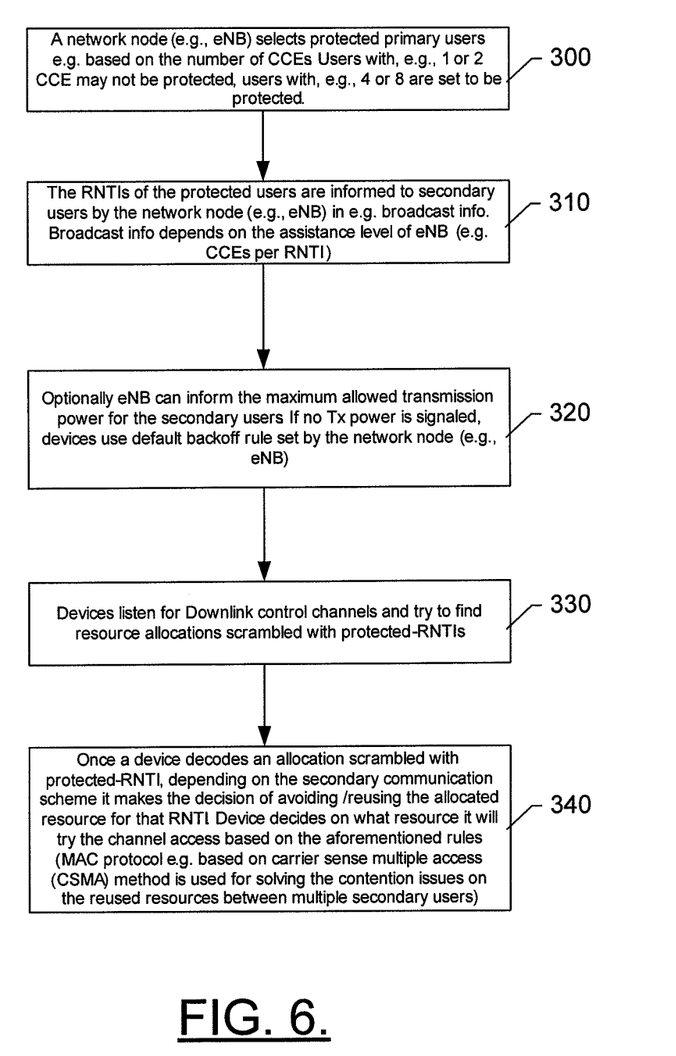
FIG. 6 illustrates an example flowchart of a proposed secondary usage procedure for a device attempting to engage in secondary communication according to an example embodiment of the present invention.

FIG. 6 illustrates an example flowchart of a proposed secondary usage procedure for a device attempting to engage in secondary communication. At operation 300, the network communication node (e.g., eNB) selects protected primary users based on channel conditions (e.g., CCEs). At operation 310, the RNTIs of protected users may be provided to secondary users (e.g., secondary user B 110 and secondary user C 112 of FIG. 4). In some examples, the eNB may also provide information regarding the maximum allowed transmission power for secondary users as indicated at operation 320. If no transmission power is signaled, devices may use default backoff rules set by the network. At operation 330, devices (e.g., secondary user B 110 and secondary user C 112) may listen for downlink control channels and try to find resource allocations scrambled with protected RNTIs. Thereafter, depending on the secondary communication scheme, devices (e.g., secondary user B 110 and secondary user C 112) may make decisions as to which resources may be reused for secondary communication or avoided at operation 340. In some embodiments, the number of CCEs as indicated by the list of RNTIs is taken into account by devices in order to limit the blind decoding of protected devices (e.g., protected UEs). This can be realized, e.g., in such that a PDCCH carried with, for example, 8 (or 4 and 8) CCEs may only be considered as a PDCCH of a potential protected UE. This limitation may reduce the number of blind decodings related to detection of protected UEs considerably. There can be also other mechanisms by which to limit the number of blind decoding related to detection of PDCCH of primary UEs, e.g., to allocate UL resource allocation grants only for PDCCHs with even (or odd) CCE starting positions. To affect these kinds of limitations, the devices associated with secondary resources may be made aware of the rules applied by the eNB.

Figure 7:
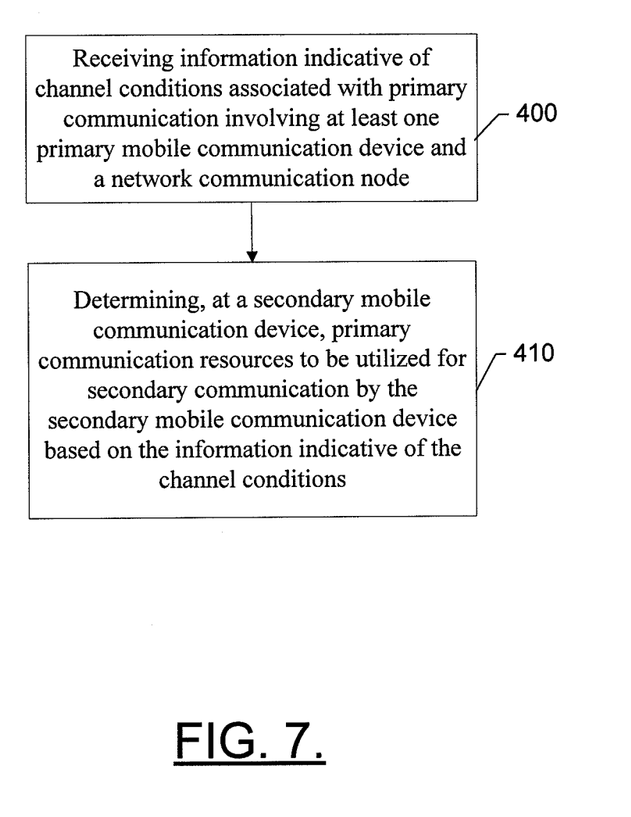
FIG. 7 illustrates a flowchart of a method of providing facilitation of semi-autonomous D2D communication in accordance with an example embodiment of the present invention.
Figure 8:
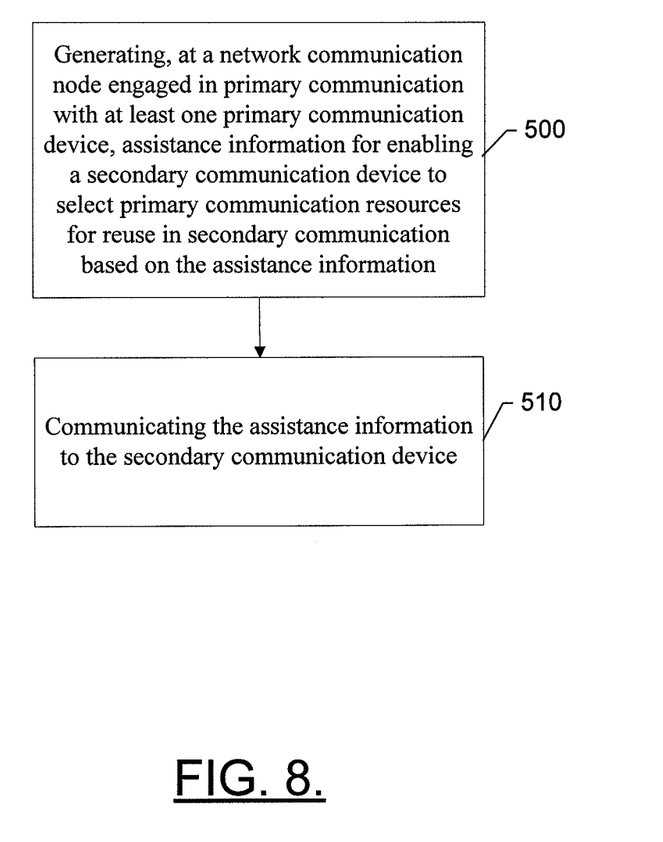
FIG. 8 illustrates a flowchart of another method of providing facilitation of semi-autonomous D2D communication in accordance with an example embodiment of the present invention.

FIGS. 7 and 8 are flowcharts of a system, method and program product according to example embodiments of the invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowcharts block(s). These computer program instructions may also be stored in a computer-readable memory that may direct a computer or other programmable apparatus to function in a particular manner, such that the instructions stored in the computer-readable memory produce an article of manufacture the execution of which implements the function specified in the flowcharts block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts block(s).

Accordingly, blocks of the flowcharts support combinations of means for performing the specified functions, combinations of operations for performing the specified functions and program instruction means for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In this regard, one embodiment of a method for providing facilitation of semi-autonomous D2D communication from the perspective of a communication device (e.g., UE), as shown in FIG. 7, includes receiving information indicative of channel conditions associated with primary communication involving at least one primary mobile communication device and a network communication node at operation 400. The method may further include determining, at a secondary mobile communication device, primary communication resources to be utilized for secondary communication by the secondary mobile communication device based on the information indicative of the channel conditions at operation 410.

In some embodiments, certain ones of the operations above may be modified or further amplified as described below. It should be appreciated that each of the modifications or amplifications below may be included with the operations above either alone or in combination with any others among the features described herein. In an example embodiment, receiving the information may include receiving signaling from the network communication node. However, in some alternative embodiments, receiving the information may include receiving the information responsive to decoding of a physical downlink control channel at the secondary mobile communication device. In some embodiments, receiving the information may include receiving signaling indicative of a radio network temporary identifier of the at least one primary mobile communication device from the network communication node. In some cases, receiving the information further includes receiving information indicative of a number of control channel elements associated with each of a plurality of radio network temporary identifiers of primary mobile communication devices actively using uplink resources of the network communication node. In an example embodiment, determining the primary communication resources to utilize for secondary communication may include determining a priority for resource re-usage to assign to the primary communication resources associated with the at least one primary mobile communication device and determining selected primary communication resources for reuse in secondary communication based on the priority. In some instances, determining the priority may include assigning mobile communication devices with a high number of control channel elements a low priority and assigning mobile communication devices with a low number of control channel elements a high priority. In an example embodiment, determining the primary communication resources to utilize for secondary communication may include performing interference measurements for devices having a number of control channel elements below a threshold. In some embodiments, determining the primary communication resources to utilize for secondary communication may include identifying mobile communication devices having a number of control channel elements above a threshold as protected devices with associated primary resources that are not to be reused for secondary communication.

Another embodiment of a method for providing facilitation of semi-autonomous D2D communication from the perspective of a network communication node (e.g., an access point or base station such as eNB 20), as shown in FIG. 8, includes generating, at a network communication node engaged in primary communication with at least one primary communication device, assistance information for enabling a secondary communication device to select primary communication resources for reuse in secondary communication based on the assistance information at operation 500, and communicating the assistance information to the secondary communication device at operation 510.

In some embodiments, certain ones of the operations above may be modified or further amplified as described below. It should be appreciated that each of the modifications or amplifications below may be included with the operations above either alone or in combination with any others among the features described herein. In an example embodiment, generating the assistance information may include generating a list of radio network temporary identifiers of a plurality of primary communication devices and/or providing an indication of a number of control channel elements associated with at least one of the list of radio network temporary identifiers. In some embodiments, communicating the assistance information may include communicating only assistance information identifying radio network temporary identifiers of primary communication devices having a number of control channel elements that exceeds a threshold.

In an example embodiment, an apparatus for performing the method of FIG. 7 above may comprise a processor (e.g., processor 170) configured to perform some or each of the operations (400-410) described above. The processor may, for example, be configured to perform the operations (400-410) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 400-410 may comprise, for example, the processor 170, the resource manager 50, and/or a device or circuit for executing instructions or executing an algorithm for processing information as described above.

In an example embodiment, an apparatus for performing the method of FIG. 8 above may comprise a processor (e.g., the processor 70) configured to perform some or each of the operations (500-510) described above. The processor may, for example, be configured to perform the operations (500-510) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 500-510 may comprise, for example, the processor 70, the resource notifier 60, and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
receiving information indicative of channel conditions associated with primary communication involving at least one primary mobile communication device and a network communication node; and
determining, at a secondary mobile communication device, primary communication resources to be utilized for secondary communication by the secondary mobile communication device based on the information indicative of the channel conditions, wherein determining the primary communication resources to utilize for secondary communication comprises determining a priority for resource re-usage to assign to the primary communication resources associated with the at least one primary mobile communication device and determining selected primary communication resources for reuse in secondary communication based on the priority.

2. The method of claim 1, wherein receiving the information comprises receiving signaling from the network communication node.

3. The method of claim 1, wherein receiving the information comprises receiving signaling indicative of a radio network temporary identifier of the at least one primary mobile communication device from the network communication node.

4. The method of claim 3, wherein receiving the information further comprises receiving information indicative of a number of control channel elements associated with each of a plurality of radio network temporary identifiers of primary mobile communication devices actively using uplink resources of the network communication node.

5. The method of claim 1, wherein determining the priority comprises assigning mobile communication devices with a high number of control channel elements a low priority and assigning mobile communication devices with a low number of control channel elements a high priority.

6. The method of claim 1, wherein determining the primary communication resources to utilize for secondary communication comprises performing interference measurements for devices having a number of control channel elements below a threshold.

7. The method of claim 1, wherein determining the primary communication resources to utilize for secondary communication comprises identifying mobile communication devices having a number of control channel elements above a threshold as protected devices with associated primary resources that are not to be reused for secondary communication.

8. The method of claim 1, wherein receiving the information comprises receiving the information responsive to decoding of a physical downlink control channel at the secondary mobile communication device.

9. The method of claim 1, wherein receiving the information further comprises receiving information indicative of a number of control channel elements associated with each of a plurality of radio network temporary identifiers of primary mobile communication devices actively using uplink resources of the network communication node, the number of control channel elements providing a basis for limiting blind decoding of protected devices.

10. An apparatus comprising at least one processor and at least one memory including computer program code, the at least one memory and the computer program code configured to, with the processor, cause the apparatus to at least:
receive information indicative of channel conditions associated with primary communication involving at least one primary mobile communication device and a network communication node; and
determine, at a secondary mobile communication device, primary communication resources to be utilized for secondary communication by the secondary mobile communication device based on the information indicative of the channel conditions,
wherein the memory and computer program code are configured to, with the processor, cause the apparatus to determine the primary communication resources to utilize for secondary communication by determining a priority for resource re-usage to assign to the primary communication resources associated with the at least one primary mobile communication device and determining selected primary communication resources for reuse in secondary communication based on the priority.

11. The apparatus of claim 10, wherein the memory and computer program code are configured to, with the processor, cause the apparatus to receive the information by receiving signaling from the network communication node or receive the information responsive to decoding of a physical downlink control channel at the secondary mobile communication device.

12. The apparatus of claim 10, wherein the memory and computer program code are configured to, with the processor, cause the apparatus to receive the information by receiving signaling indicative of a radio network temporary identifier of the at least one primary mobile communication device from the network communication node.

13. The apparatus of claim 12, wherein the memory and computer program code being configured to, with the processor, cause the apparatus to receive the information further comprises being configured to cause the apparatus to receive information indicative of a number of control channel elements associated with each of a plurality of radio network temporary identifiers of primary mobile communication devices actively using uplink resources of the network communication node.

14. The apparatus of claim 10, wherein the memory and computer program code are configured to, with the processor, cause the apparatus to determine the priority by assigning mobile communication devices with a high number of control channel elements a low priority and assigning mobile communication devices with a low number of control channel elements a high priority.

15. The apparatus of claim 10, wherein the memory and computer program code are configured to, with the processor, cause the apparatus to determine the primary communication resources to utilize for secondary communication by performing interference measurements for devices having a number of control channel elements below a threshold.

16. A method comprising:

generating, at a network communication node engaged in primary communication with at least one primary communication device, assistance information for enabling a secondary communication device to select primary communication resources for reuse in secondary communication based on the assistance information, wherein generating the assistance information comprises generating a list of radio network temporary identifiers of a plurality of primary communication devices and providing an indication of a number of control channel elements associated with at least one of the list of radio network temporary identifiers; and communicating the assistance information to the secondary communication device.

17. A method comprising:

generating, at a network communication node engaged in primary communication with at least one primary communication device, assistance information for enabling a secondary communication device to select primary communication resources for reuse in secondary communication based on the assistance information; and communicating the assistance information to the secondary communication device, wherein communicating the assistance information comprises communicating only assistance information identifying radio network temporary identifiers of primary communication devices having a number of control channel elements that exceeds a threshold.

* * * * *